(12) United States Patent
Zhou et al.

(10) Patent No.: US 12,463,204 B2
(45) Date of Patent: Nov. 4, 2025

(54) NEGATIVE ELECTRODE MATERIAL AND PREPARATION METHOD THEREFOR, AND LITHIUM-ION BATTERY

(71) Applicant: BTR NEW MATERIAL GROUP CO., LTD., Guangdong (CN)

(72) Inventors: Haihui Zhou, Guangdong (CN); Junhui Lai, Guangdong (CN); Tao Xu, Guangdong (CN); Jianguo Ren, Guangdong (CN); Xueqin He, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 830 days.

(21) Appl. No.: 17/623,303

(22) PCT Filed: May 27, 2021

(86) PCT No.: PCT/CN2021/096485
§ 371 (c)(1),
(2) Date: Dec. 28, 2021

(87) PCT Pub. No.: WO2021/239063
PCT Pub. Date: Dec. 2, 2021

(65) Prior Publication Data
US 2022/0367857 A1 Nov. 17, 2022

(30) Foreign Application Priority Data
May 28, 2020 (CN) .......................... 202010470772.7

(51) Int. Cl.
*H01M 4/36* (2006.01)
*C01B 32/21* (2017.01)
(Continued)

(52) U.S. Cl.
CPC ............. *H01M 4/366* (2013.01); *C01B 32/21* (2017.08); *H01M 4/587* (2013.01);
(Continued)

(58) Field of Classification Search
CPC .. H01M 4/366; H01M 4/587; H01M 10/0525; H01M 2004/021;
(Continued)

(56) References Cited

FOREIGN PATENT DOCUMENTS

| CN | 103078090 A | 5/2013 |
| CN | 105226251 A | 1/2016 |

(Continued)

OTHER PUBLICATIONS

PCT International Search Report for PCT Application No. PCT/CN2021/096485 mailed Sep. 1, 2021 (5 pages, with English translation).

(Continued)

*Primary Examiner* — Helen Oi K Conley
(74) *Attorney, Agent, or Firm* — Merchant & Gould P.C.

(57) ABSTRACT

The present application provides a negative electrode material, a preparation method thereof, and a lithium ion battery. The negative electrode material comprises a first graphite core and a composite coating layer coated on the first graphite core. The composite coating layer comprises a second graphite inner layer formed on the surface of the first graphite core and an amorphous carbon outer layer formed on the surface of the second graphite inner layer. The second graphite inner layer is graphite microcrystal. The preparation method comprises: mixing the first graphite and the second graphite and performing the coating treatment to obtain the first graphite coated with the second graphite, wherein the second graphite is graphite microcrystals; and making the first graphite coated with the second graphite, coated with carbon, to obtain the negative electrode mate- (Continued)

rial. The negative electrode material provided in the present application utilizes the mutual cooperation between the second graphite inner layer and the amorphous carbon outer layer in the composite coating layer to make the negative electrode material have the high capacity, the low irreversible capacity, and the excellent power performance.

20 Claims, 2 Drawing Sheets

(51) Int. Cl.
*H01M 4/02* (2006.01)
*H01M 4/587* (2010.01)
*H01M 10/0525* (2010.01)
(52) U.S. Cl.
CPC ..... *H01M 10/0525* (2013.01); *C01P 2002/02* (2013.01); *C01P 2004/03* (2013.01); *C01P 2004/32* (2013.01); *C01P 2004/61* (2013.01); *C01P 2004/84* (2013.01); *C01P 2006/11* (2013.01); *C01P 2006/12* (2013.01); *C01P 2006/40* (2013.01); *H01M 2004/021* (2013.01); *H01M 2004/027* (2013.01)
(58) Field of Classification Search
CPC ........... H01M 2004/027; H01M 4/133; H01M 4/1393; H01M 4/625; H01M 4/583; C01B 32/21; C01P 2002/02; C01P 2004/03; C01P 2004/32; C01P 2004/61; C01P 2004/84; C01P 2006/11; C01P 2006/12; C01P 2006/40; C01P 2004/64; Y02E 60/10
See application file for complete search history.

(56) References Cited

FOREIGN PATENT DOCUMENTS

| CN | 107732152 A | 2/2018 | | |
|---|---|---|---|---|
| CN | 109599456 A | 4/2019 | | |
| CN | 109616638 A | 4/2019 | | |
| CN | 109616639 A | 4/2019 | | |
| JP | 2004214192 A | 7/2004 | | |
| JP | 2005302725 A | 10/2005 | | |
| JP | 201009980 A | 1/2010 | | |
| JP | 10-2015-0063620 | * | 6/2015 | .......... H01M 10/052 |
| JP | 2016186912 A | 10/2016 | | |
| KR | 20050099697 A | 10/2005 | | |
| WO | 2012001844 A1 | 1/2012 | | |
| WO | 2012001845 A1 | 1/2012 | | |
| WO | 2012/029505 A1 | 3/2012 | | |

OTHER PUBLICATIONS

PCT Written Opinion for PCT Application No. CT/CN2021/096485 mailed Sep. 1, 2021 (8 pages).
Chinese Office Action for CN Application No. 202010470772.7 mailed Jan. 12, 2021 (12 pages, with English translation).
Chinese Office Action for CN Application No. 202010470772.7 mailed Jun. 11, 2021 (15 pages, with English translation).
Korean Decision to Grant received for KR Application No. 202010470772.7 on Aug. 5, 2025, 5 pgs.
Japanese Decision to Grant received for JP Application No. 2021-573201 on Jun. 19, 2023, 5 pgs.

* cited by examiner

NEGATIVE ELECTRODE MATERIAL AND PREPARATION METHOD THEREFOR, AND LITHIUM-ION BATTERY

CROSS-REFERENCE TO RELATED APPLICATIONS

This application is a National Stage Application of PCT/CN2021/096485, filed 27 May 2021, which claims priority benefit to Application No. 202010470772.7 filed with the Chinese Patent Office on 28 May 2020, and entitled "Composite Coating Negative Electrode Material, Preparation Method Thereof, and Lithium Ion Battery", all the contents of which are incorporated herein by reference in their entirety.

TECHNICAL FIELD

The present application belongs to the technical field of negative electrode materials, and relates to a negative electrode material, a preparation method thereof, and a lithium ion battery.

BACKGROUND ART

A lithium ion battery, which has excellent performances of the high energy density, the high working voltage, the long cycle life, being environmentally friendly, and the fast electric charge and discharge, and the decreasing production cost, is used in 3C products, power plants, energy storage devices and other fields extensively more and more. At present, commercial lithium ion batteries mainly use graphite negative electrode materials. Start-stop power supplies, light hybrid electric vehicles, power tools and the like require lithium ion batteries to have performance of the electric charge and discharge at high rate, which requires the negative electrode material to have higher power performance. In the existing technology, generally, the material, i.e., the artificial graphite or hard carbon, is used as the high-power negative electrode material, but the artificial graphite or hard carbon has the shortcoming of low energy density and high cost.

There is an existing high-power carbon-coated artificial graphite negative electrode material, wherein the coal-based green coke is used as raw material for performing the modification heat treatment and the graphitization treatment at room temperature, and afterwards, the asphalt coating modification is carried out to obtain the negative electrode material product, which has the smaller reaction impedance and improves the low-temperature performance and power characteristics of the material, but the artificial graphite negative electrode material prepared by this method has low power density and relatively high cost.

Another kind of composite coated graphite negative electrode material with the hamburger structure is a kind of material of a composite coating structure, with artificial carbon particles bonded on the surface of the particles, with the purified spherical natural graphite as the core. The production steps are as follows: first, using low-coking-value modified asphalt to coat the surface of the natural graphite core, to obtain the "core" of the material; adding artificial carbon particles and high-coking-value modified asphalt to form a package for the "core" part by high-speed dispersion granulation, with its microscopic morphology being similar to "hamburger"; and finally, obtaining a composite coated graphite negative electrode material after the heat treatment. However, the artificial graphite negative electrode material prepared by this method has low power density and high cost.

Therefore, the development of a negative electrode material with excellent power performance, high energy density and low cost has a good application prospect.

SUMMARY

As for the above-mentioned problems existing in the prior art, the present application provides a negative electrode material, a preparation method thereof, and a lithium ion battery. The negative electrode material provided by the present application has high capacity, high first-time Coulombic efficiency, good rate performance, and excellent power performance, and the preparation process is simple and the cost is low.

To achieve this objective, the present application adopts the following technical solutions.

In a first aspect, the present application provides a negative electrode material. The negative electrode material comprises a first graphite core and a composite coating layer coated on the first graphite core. The composite coating layer comprises a second graphite inner layer located on a surface of the first graphite core and an amorphous carbon outer layer formed on a surface of the second graphite inner layer, and the second graphite inner layer comprises a plurality of graphite microcrystals.

In the above solution, the negative electrode material provided in the present application mainly utilizes the mutual cooperation between the second graphite inner layer and the amorphous carbon outer layer in the composite coating layer, so that the composite coating negative electrode material has high capacity, low irreversible capacity, and excellent power performance. When the second graphite is the graphite microcrystals (also called as microcrystalline graphite), the graphite microcrystals in the inner layer and the amorphous carbon in the outer layer have an excellent mutual cooperation effect. The graphite microcrystal in the inner layer has a higher gram capacity, which can increase the gram capacity of the coating layer. The amorphous carbon of the outer layer has a low irreversible capacity, which can improve the first-time efficiency of the coating layer. The coating layer of graphite microcrystal composite amorphous carbon has a higher specific capacity and a higher degree of disorder than a single amorphous carbon coating layer. At the same time, it overcomes the defects, such as, high irreversible capacity or low gram capacity of a single coating layer, which can greatly improve the power performance of natural graphite.

In combination with the first aspect, in one feasible embodiment, the first graphite core comprises natural graphite, and the first graphite core satisfies at least one of following conditions a to e:
  a. the first graphite core comprises natural graphite;
  b. the first graphite core is spherical natural graphite;
  c. the first graphite core has a median particle diameter of 2.0 μm~30.0 μm,
  d. the natural graphite has a powder-body tap density of 0.4 g/cm$^3$~1.0 g/cm$^3$; and
  e. a mass percentage content of fixed carbon in the natural graphite is ≥99.9%.

In combination with the first aspect, in one feasible embodiment, the graphite microcrystal satisfies at least one of following conditions a to e:
  a. the graphite microcrystals are at least partially embedded in the first graphite core;

b. a ratio of the median particle diameter of the first graphite core to a median particle diameter of the graphite microcrystal is 5:1~50:1;
c. the median particle diameter of the graphite microcrystal is 0 μm~2 μm, not including 0 μm;
d. the fixed carbon content of the graphite microcrystal is ≥99.9%; and
e. the powder-body tap density of the graphite microcrystal is 0 g/cm$^3$~0.5 g/cm$^3$, not including 0 g/cm$^3$.

In combination with the first aspect, in one feasible embodiment, it satisfies at least one of following conditions a~e:
a. the median particle diameter of the negative electrode material is 2 μm~32 μm, not including 2 μm;
b. the negative electrode material has a specific surface area of 0.5 m$^2$/g~20.0 m$^2$/g;
c. the powder-body tap density of the negative electrode material is 0.5 g/cm$^3$~1.3 g/cm$^3$;
d. the composite coating layer has thickness of 0 μm~5 μm, not including 0 μm; and
e. the amorphous carbon outer layer has thickness of 0 nm~500 nm, not including 0 nm.

In the second aspect, the present application provides a preparation method for a negative electrode material, comprising following steps:
mixing a first graphite and a second graphite and performing a coating treatment to obtain the first graphite coated by the second graphite, wherein the second graphite is of graphite microcrystal; and
making the first graphite coated by the second graphite, coated with carbon, to obtain negative electrode material.

In the above solution, a coating process is used to form a composite coating layer on the first graphite core. The process is simple, the raw material cost is low, and it is suitable for large-scale industrial production. The prepared composite coating negative electrode material has high capacity, low irreversible capacity, and excellent power performance.

In combination with the second aspect, in one feasible embodiment, the negative electrode material satisfies at least one of following conditions a~j:
a. the graphite microcrystals are at least partially embedded in the first graphite;
b. the first graphite is spherical (spheroidal) natural graphite;
c. the first graphite has a median particle diameter of 2.0 μm~30.0 μm;
d. the first graphite is spherical natural graphite, and a mass percentage content of fixed carbon in the natural graphite is ≥99.9%;
e. a ratio of the median particle diameter of the first graphite to a median particle diameter of the graphite microcrystal is 5:1-50:1;
f. the median particle diameter of the graphite microcrystal is 0 μm~2 μm, not including 0 μm;
g. the negative electrode material has a median particle diameter of 2 μm~32 μm, not including 2 μm;
h. the negative electrode material has a specific surface area of 0.5 m$^2$/g~20.0 m$^2$/g;
i. the negative electrode material has a powder-body tap density of 0.5 g/cm$^3$~1.3 g/cm$^3$; and
j. the composite coating layer has a thickness of 0 μm~5 μm, not including 0 μm.

In combination with the second aspect, in one feasible embodiment, before mixing and coating the first graphite and the second graphite, the method further comprises:

purifying the graphite microcrystals with an acidic aqueous solution, so that the fixed carbon content of the graphite microcrystal is 99.9%.

In combination with the second aspect, in one feasible embodiment, the steps of purifying graphite microcrystals comprise:
crushing the graphite microcrystals, so that the median particle diameter of particles of the graphite microcrystal is controlled within 0 μm~2 μm, not including 0 μm; and
purifying the graphite microcrystals with an acidic aqueous solution, so that the fixed carbon content of the graphite microcrystals is ≥99.9%.

In combination with the second aspect, in one feasible embodiment, the method satisfies at least one of the following conditions a~b:
a. acid in the acidic aqueous solution is inorganic acid; and
b. acid in the acidic aqueous solution is inorganic acid, and the inorganic acid comprises at least one of HCl, HF, H$_2$SO$_4$ and HNO$_3$.

In combination with the second aspect, in one feasible embodiment, the method satisfies at least one of the following conditions a~e:
a. a mass ratio of the first graphite to the second graphite is (80~100):(0~20), and mass of the second graphite is not 0;
b. a mass ratio of the first graphite and the second graphite is (90~100):(1~10);
c. using a fusion machine for performing a coating treatment, wherein a rotation speed of the fusion machine is 500 r/min~3000 r/min;
d. using a fusion machine for performing a coating treatment, wherein a cutter gap of the fusion machine has a width of 0.01 cm~0.5 cm; and
e. duration of the coating treatment is 10 min~120 min.

In combination with the second aspect, in one feasible embodiment, wherein the step of making the first graphite coated by the second graphite, coated with carbon, to obtain negative electrode material comprises:
making, the first graphite coated by the second graphite, mixed with an amorphous carbon precursor, and performing a carbonization treatment in a protective atmosphere, to obtain a negative electrode material.

In combination with the second aspect, in one feasible embodiment, the method satisfies at least one of the following conditions a~j:
a. a mass ratio of the first graphite coated by the second graphite to the amorphous carbon precursor is (80~100):(0~20), and mass of the amorphous carbon precursor is not 0;
b. a mass ratio of the first graphite coated by the second graphite to the amorphous carbon precursor is (80~100):(2~20);
c. the amorphous carbon precursor comprises asphalt and/or resin;
d. the amorphous carbon precursor comprises asphalt, and the asphalt comprises at least one of coal asphalt, petroleum asphalt, modified asphalt, and mesophase asphalt;
e. the amorphous carbon precursor comprises resin, and the resin comprises at least one of phenolic resin, epoxy resin and furfural resin;
f. the mixing has duration more than 5 min,
g. gas of the protective atmosphere comprises at least one of nitrogen, helium, neon, argon and xenon;

h. temperature of the carbonization treatment is 800° C.~1400° C.;

i. duration of the carbonization treatment is 1 h~72 h; and j. a heating rate of the carbonization treatment is below 20.0° C./min.

In combination with the second aspect, in one feasible embodiment, after the first graphite coated by the second graphite is coated with carbon to obtain the negative electrode material, the method further comprises:

making the negative electrode material crushed, sieved and demagnetized, so that a median particle diameter of the negative electrode material is controlled at 2.0 μm~30.0 μm.

In combination with the second aspect, in one feasible embodiment, the method comprises the following steps:

purifying the graphite microcrystals with an acidic aqueous solution, so that a fixed carbon content is greater than or equal to 99.9%;

mixing a natural graphite and graphite microcrystal powder based on a mass ratio of (90~100):(1~10), and carrying out a coating treatment for 10 min~120 min, so as to obtain the natural graphite coated by graphite microcrystals; and mixing the natural graphite coated by graphite microcrystals and an amorphous carbon precursor based on a mass ratio of (80~100):(2~20); increasing a temperature to 800° C. to 1400° C. at a heating rate of 1.0° C./min~5.0° C./min and performing a carbonization treatment for 1 h to 24 h, under a protective gas atmosphere, to obtain the negative electrode material.

In the third aspect, the present application provides a lithium ion battery, wherein the lithium ion battery comprises the negative electrode material as mentioned in the first aspect or the negative electrode material prepared according to the preparation method as mentioned in the second aspect.

Compared with the prior art, the present application has the following beneficial effects.

(1) The composite coating negative electrode material provided by the present application mainly utilizes the mutual cooperation between the second graphite inner layer and the amorphous carbon outer layer in the composite coating layer, so that the composite coating negative electrode material has high capacity, low irreversible capacity, and excellent power performance. When the second graphite is the graphite microcrystals (also called as microcrystalline graphite), the graphite microcrystals in the inner layer and the amorphous carbon in the outer layer have an excellent mutual cooperation effect. The graphite microcrystal in the inner layer has a higher gram capacity, which can increase the gram capacity of the coating layer. The amorphous carbon of the outer layer has a low irreversible capacity, which can improve the first-time efficiency of the coating layer. The coating layer of graphite microcrystal composite amorphous carbon has a higher specific capacity and a higher degree of disorder than a single amorphous carbon coating layer. At the same time, it overcomes the defects, such as, high irreversible capacity or low gram capacity of a single coating layer, which can greatly improve the power performance of natural graphite.

(2) In the preparation method provided by the present application, a coating process is used to form a composite coating layer on the first graphite core. The process is simple, the raw material cost is low, and it is suitable for large-scale industrial production. The prepared composite coating negative electrode material has high capacity, low irreversible capacity, and excellent power performance.

DETAILED DESCRIPTION OF EMBODIMENTS

In order to better explain the present application and understand the technical solutions of the present application, the present application will be explained in further detail below. However, the following examples are only simple examples of the present application, and do not represent or limit the scope of protection of the present application. The scope of protection of the present application is subject to the claims.

The following are examples of the present application, which are typical but not in sense of limitation.

Figure 1:
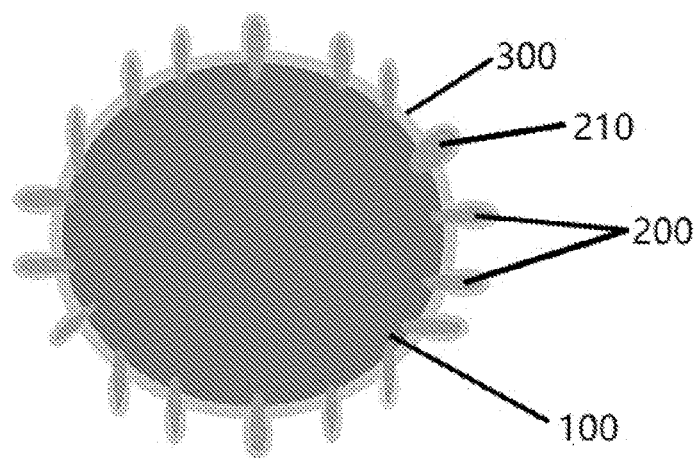
FIG. 1 is a schematic structural diagram of the negative electrode material provided by an embodiment of the present application.

In the first aspect, as shown in FIG. 1, the negative electrode material of an embodiment comprises a first graphite core 100 and a composite coating layer coated on the first graphite core, and the composite coating layer comprises the second graphite inner layer 200 located on the surface of the first graphite core 100 and the amorphous carbon outer layer 300 located on the surface of the second graphite inner layer 200. The second graphite inner layer 200 comprises a plurality of graphite microcrystals 210.

The foregoing negative electrode material utilizes the mutual cooperation between the second graphite inner layer 200 and the amorphous carbon outer layer 300 in the composite coating layer, so that the negative electrode material has high capacity, relatively low irreversible capacity and excellent power performance. Due to the small particle diameter of the graphite microcrystals, the crystal arrangement has high degree of disorder, the carbon structure in the composite coating layer formed by combining with amorphous carbon has the high degree of disorder. The number of surface lithium-ion transmission channels increases, and the lithium-ion transmission path is short, so it has excellent power performance.

Moreover, since the second graphite is of the graphite microcrystal, although the graphite microcrystals have the excellent power performance and higher gram capacity, the surface thereof has many defects and the graphite microcrystals have relatively high irreversible capacity. If used alone as a coating layer for natural graphite, it has the defect of low efficiency for the first time. The amorphous carbon, used alone as the coating layer for the natural graphite, can improve the first-time efficiency of the natural graphite, but the amorphous carbon has a lower gram capacity, which will reduce the energy density of the coated natural graphite. Therefore, the graphite microcrystals and the amorphous carbon are used together to form a composite coating layer, so that the synergistic reaction between them can be fully utilized. The graphite microcrystal in the inner layer has a higher gram capacity, which can increase the gram capacity of the composite coating layer. The amorphous carbon in the outer layer has a low irreversible capacity, which can improve the first-time efficiency of the composite coating layer. As a result, the negative electrode material has high capacity, relatively low irreversible capacity and excellent power performance.

The following are optional technical solutions of the present application, but not as a limitation to the technical solutions provided by the present application. Through the following optional technical solutions, the technical objectives and beneficial effects of the present application can be better achieved and realized.

Referring to FIG. 1 again, in the negative electrode material of this embodiment, each of the graphite microcrystals 210 is at least partially embedded in the first graphite core 100 to form a second graphite inner layer 200 which is at least partially embedded in the first graphite core 100. With this coating form, each of the graphite microcrystals 210 is at least partially embedded in the first graphite core 100 to form a stronger structure. Compared with the graphite microcrystals 210 which are not embedded in the first graphite core 100, i.e., the structure in which the graphite microcrystals 210 are directly located at the surface layer of the first graphite core 100, the stronger and tighter connection is formed between the graphite microcrystals 210 and the first graphite core 100, and it can avoid the problem of the relatively large internal resistance of the material, which is caused by tiny gaps, with the tiny gaps possible of existing in the structure that the graphite microcrystals are not be embedded in the first graphite core 100. The negative electrode material obtained in the present application has a high capacity, relatively low irreversible capacity and excellent power performance.

In the negative electrode material of this embodiment, the amorphous carbon layer 300 is also located on the surface of the first graphite core 100. It can be understood that a part of the surface of the first graphite core 100 that is not covered by the second graphite inner layer 200 is covered with an amorphous carbon layer 300.

In the negative electrode material of this embodiment, the first graphite core comprises natural graphite; and further, the first graphite core 100 is spheroidized natural graphite. Specifically, it can be obtained by spheroidizing the scaly natural graphite.

The median particle diameter D50 of the first graphite core 100 is 2 μm-30.0 μm. It specifically can be 3.0 μm, 5.0 μm, 8 μm, 10.0 μm, 15.0 μm, 18 μm, 20.0 μm, 25.0 μm, 28 μm, 30.0 μm and the like, but it is not limited to the listed values, and other unlisted values within this numerical range are applicable as well. The applicant found, through many experiments, that when the median particle diameter of the first graphite core is controlled within the range of 2.0 μm~30.0 μm, it is beneficial to increase the power performance, energy density and other electrochemical properties of the negative electrode material. Considering the preparation cost and process difficulty, further preferably, the median particle diameter D50 of the first graphite core 100 is 3.0 μm-20.0 μm, and further preferably, the median particle diameter D50 of the first graphite core is 6.0 μm-15.0 μm.

As an optional technical solution of the present application, the powder-body tap density of the natural graphite is 0.4 g/cm$^3$~1.0 g/cm$^3$, specifically, may be 0.4 g/cm$^3$, 0.5 g/cm$^3$, 0.6 g/cm$^3$, 0.7 g/cm$^3$, 0.8 g/cm$^3$, 0.9 g/cm$^3$ or 1.0 g/cm$^3$ and the like, but it is not limited to the listed values, and other unlisted values within this range of values are applicable as well. The applicant found, through many experiments, that when the powder-body tap density of natural graphite is controlled within the above range, it is beneficial to increase the energy density of the negative electrode material.

As an optional technical solution of the present application, the mass percentage content of fixed carbon in the natural graphite is ≥99.9%. The use of natural graphite whose fixed carbon has the mass percentage content of ≥99.9% can make the prepared negative electrode material have high capacity, relatively low irreversible capacity, excellent power performance and cycle performance, high first-time efficiency and other electrochemical properties.

As an optional technical solution of the present application, the second graphite inner layer is graphite microcrystal, and the graphite microcrystal refers to a dense aggregate composed of tiny natural graphite crystals, also known as earthy graphite or amorphous graphite.

As an optional technical solution of the present application, the ratio of the median particle diameter of the first graphite core 100 to the median particle diameter of the graphite microcrystal 210 is 5:1-50:1. Specifically, it may be 5:1, 10:1, 15:1, 20:1, 30:1, 35:1, 40:1, 45:1 or 50:1 and the like. By controlling the ratio of the median particle diameter of the first graphite core 100 to the median particle diameter of the graphite microcrystal 210 within the above range, the graphite microcrystal 210 with a smaller particle diameter can be made to be embedded in the first graphite core 100, to form a more stable structure, and the defects of the first graphite may be solved by means of the excellent power performance and relatively high gram capacity of graphite microcrystal, so that the negative electrode material has high capacity, relatively low irreversible capacity and excellent power performance.

Further, the median particle diameter of the graphite microcrystal 210 is 0 μm to 2 μm, not including 0 μm; and specifically, it may be 0.5 μm, 0.8 μm, 1.0 μm, 1.2 μm, 1.5 μm, 1.8 μm, or 2.0 μm and the like, but it is not limited to the listed values, and other unlisted values within this range of values are applicable as well. The median particle diameter of graphite microcrystal is controlled within the above range, the particle diameter of graphite microcrystal is smaller, and the degree of disorder of crystal arrangement is high, and thus the lithium-ion transmission path can be effectively shortened. Moreover, graphite microcrystal has excellent power performance and relatively high gram capacity.

As an optional technical solution of the present application, the powder-body tap density of the graphite microcrystals 210 is 0 g/cm$^3$-0.5 g/cm$^3$, not including 0 g/cm$^3$.

As an optional technical solution of the present application, the fixed carbon content of the graphite microcrystal 210 is greater than or equal to 99.9%. When the graphite microcrystal carbon content is greater than or equal to 99.9%, it can reduce the occurrence of side reactions of the negative electrode material during the electrochemical reaction and reduce the irreversible capacity, so as to improve power performance, cycle performance, and rate performance.

As an optional technical solution of the present application, the thickness of the amorphous carbon outer layer 300 is 0 nm to 500 nm, not including 0 nm. The amorphous carbon alone serves as the coating layer for the first graphite core (natural graphite) and graphite microcrystal, which can improve the first-time efficiency of the material, but the amorphous carbon has a low gram capacity, which will reduce the energy density of the coated natural graphite. If the amorphous carbon thickness is too thick, the gram capacity of the negative electrode material will be lower, and the soft carbon coating layer which is too thick will increase the internal resistance of the negative electrode material and affect the power performance.

As an optional technical solution of the present application, the thickness of the composite coating layer is 0 μm-5

μm, not including 0 μm; and the presence of the composite coating layer on the surface of the first graphite core improves the first-time efficiency, cycle performance, and rate performance of the negative electrode material.

As an optional technical solution of the present application, the median particle diameter of the negative electrode material is 2.0 μm~32.0 μm, not including 2 μm; and specifically, it can be 2.4 μm, 5.0 μm, 10.0 μm, 15.0 μm, 20.0 μm, 25.0 μm or 30.0 μm and the like, but it is not limited to the listed values, and other unlisted values within this range of values are applicable as well. Controlling the median particle diameter of the negative electrode material within the above range is beneficial for improving the cycle performance of the negative electrode material. Preferably, the median particle diameter of the negative electrode material is 3.0 μm-20.0 μm, and more preferably 6.0 μm-15.0 μm.

As an optional technical solution of the present application, the specific surface area of the negative electrode material is 0.5 m²/g-20.0 m²/g, specifically, may be 0.5 m²/g, 0.8 m²/g, 10.0 m²/g, 15.0 m²/g, 18.5 m²/g, 20.0 m²/g and the like, but it is not limited to the listed values, and other unlisted values within this range of values are applicable as well. Controlling the specific surface area of the negative electrode material within the above range is beneficial for improving the cycle stability of the negative electrode material. The specific surface area of the negative electrode material is preferably 1.0 m²/g to 10.0 m²/g.

As an optional technical solution of the present application, the powder-body tap density of the negative electrode material is 0.5 g/cm³-1.3 g/cm³, specifically, may be 0.5 g/cm³, 0.8 g/cm³, 1.0 g/cm³, 1.1 g/cm³ or 1.3 g/cm³ and the like, but it is not limited to the listed values, and other unlisted values within this range of values are applicable as well. The powder-body tap density of the negative electrode material is preferably 0.7 to 1.0 g/cm³.

Figure 2:
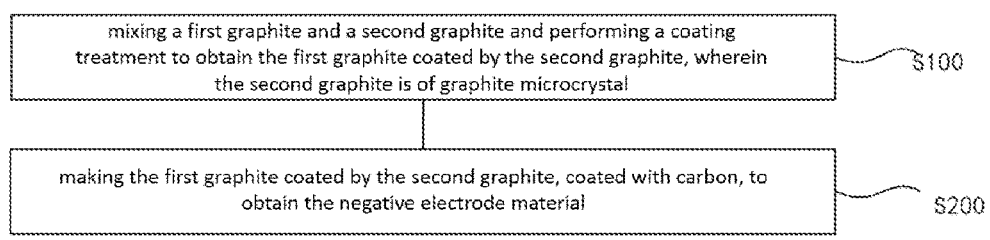
FIG. 2 is a process flow diagram of a preparation method for the negative electrode material provided by an embodiment of the present application.

In the second aspect, the present application provides a preparation method for negative electrode material, as shown in FIG. 2, comprising the following steps: Step S100, mixing the first graphite and the second graphite and performing a coating process to obtain the first graphite coated by a second graphite, wherein the second graphite is graphite microcrystals; and Step S200, making the first graphite coated by the second graphite coated with carbon, to obtain negative electrode material.

The negative electrode material prepared by the preparation method provided in the present application comprises a first graphite core 100 and a composite coating layer coated on the first graphite core, and the composite coating layer comprises a second graphite inner layer 200 located on a surface of the first graphite core and an amorphous carbon outer layer 300 located on the surface of the second graphite inner layer. The second graphite inner layer 200 comprises a plurality of graphite microcrystals 210.

In the preparation method provided in the present application, the graphite microcrystals are coated onto the surface of the first graphite, and the defects of the first graphite is improved by using the excellent power performance and higher gram capacity of graphite microcrystals; and then by means of being coated with the amorphous carbon, a stronger structure of the first graphite-graphite microcrystal-amorphous carbon layer is formed, such that the negative electrode material has high capacity, low irreversible capacity and excellent power performance. Due to the small particle diameter of the graphite microcrystals, the disorder degree of crystal arrangement is high, the carbon structure in the composite coating layer formed by combining with amorphous carbon has the high disorder degree, the surface lithium-ion transmission channels are increased in number, and the lithium-ion transmission path is short, so it has excellent power performance. In addition, this preparation method is simple, the raw material cost is low, and the preparation process is environmentally friendly, and is suitable for large-scale production.

The preparation method provided by this solution is described in detail as follows.

In Step S100, the first graphite and the second graphite are mixed and subjected to the coating treatment to obtain the first graphite coated with the second graphite, wherein the second graphite is graphite microcrystal.

As an optional technical solution of the present application, the first graphite is spheroidized natural graphite. Specifically, it can be obtained by performing the spheroidization treatment to the scaly natural graphite. The fixed carbon content in the natural graphite has the mass percent of ≥99.9%.

The median particle diameter D50 of the first graphite is 2 μm-30 μm, specially, may be 2.0 μm, 5.0 μm, 8 μm, 10.0 μm, 15.0 μm, 18 μm, 20.0 μm, 25.0 μm, 28 μm, 30.0 μm and the like, but it is not limited to the listed values, and other unlisted values within this numerical range are applicable as well. Controlling the median particle diameter of the first graphite within the above range is beneficial for increasing the rate performance, power performance, and cycle performance of the negative electrode material. Considering the preparation cost and process difficulty, preferably, the median particle diameter D50 of the first graphite is 3.0 μm-20.0 μm, and further preferably, the median particle diameter D50 of the first graphite is 6.0 μm-15.0 μm.

As an optional technical solution of the present application, the second graphite is graphite microcrystal, and the graphite microcrystal refers to a dense aggregate composed of tiny natural graphite crystals, also known as earthy graphite or amorphous graphite.

Further, before Step S100, the method further comprises:
purifying the graphite microcrystals with an acidic aqueous solution so that the fixed carbon content of the graphite microcrystals is ≥99.9%.

Specifically, the step of purifying the graphite microcrystals comprises:
crushing the graphite microcrystals so that the median particle diameter of the graphite microcrystal particles is controlled within 0 μm~2 μm, not including 0 μm; and
purifying the graphite microcrystals with an acidic aqueous solution to make the fixed carbon content of the graphite microcrystal is ≥99.9%.

It can be understandable that graphite microcrystals contain a large amount of trace elements, such as Fe, Co, Cu, Ni, Al, Cr, Zn, and impurities such as $SiO_2$. The presence of these impurities will cause the irreversible capacity of the graphite microcrystals increased, leading to the first-time efficiency to be low, affecting its cycle performance, rate performance, and safety performance. Therefore, it is necessary to carry out acid pickling and purifying to graphite microcrystals to remove the trace elements and impurities, such as $SiO_2$, in the graphite microcrystals, so that its fixed carbon content is ≥99.9%, improving the first-time efficiency, cycle performance, rate performance, and safety performance of the graphite microcrystals. In addition, the large specific surface area of the graphite microcrystals is one of the main reasons for its low first-time efficiency. By coating a layer of amorphous carbon on the surface of the graphite microcrystals, the specific surface area of the graphite microcrystals can be reduced and its first-time efficiency can be effectively improved. Therefore, the present application adopts the process in which the acid pickling and purification are performed firstly, and then the amorphous carbon layer is coated, which can wash away the impurities in the graphite microcrystals, improve the first-time Coulombic efficiency of the negative electrode material, and enhance the cycle performance of the negative electrode material.

Optionally, the ratio of the median particle diameter of the first graphite core 100 to the median particle diameter of the graphite microcrystals 210 is 5:1-50:1, and specifically, it may be 5:1, 10:1, 15:1, 20:1, 30:1, 35:1, 40:1, 45:1, or 50:1 and the like. By controlling the ratio of the median particle diameter of the first graphite core 100 to the median particle diameter of the graphite microcrystals 210 within the above range, the graphite microcrystal 210 with a smaller particle diameter is made to be embedded in the first graphite core 100 to form a more stable structure, and the defects of the first graphite are solved by using the excellent power performance and higher gram capacity of the graphite microcrystals, so that the negative electrode material has high capacity, relatively low irreversible capacity and excellent power performance.

Further, the median particle diameter of the graphite microcrystal 210 is 0 μm to 2 μm, not including 0 μm, and specifically, it may be 0.5 μm, 0.8 μm, 1.0 μm, 1.2 μm, 1.5 μm, 1.8 μm, or 2.0 μm and the like, but it is not limited to the listed values, and other unlisted values within this range of values are applicable as well. When controlling the median particle diameter of graphite microcrystals within the above range, the particle diameter of the graphite microcrystals is small, the disorder degree of the crystal arrangement is high, and the lithium-ion transmission path can be effectively shortened. Moreover, the graphite microcrystals have excellent power performance and relatively high gram capacity.

Optionally, the acid in the acidic aqueous solution is inorganic acid. In a specific embodiment, the inorganic acid comprises at least one of HCl, HF, $H_2SO_4$ and $HNO_3$.

As an optional technical solution for the present application, the mass ratio of the first graphite to the second graphite is (80-100):(0-20) and the mass of the second graphite is not 0. Specifically, it can be 80:1, 90:1, 100:1, 80:10, 100:10, 90:10, 80:20 or 100:20 and the like, but it is not limited to the listed values, and others values unlisted in the numerical range are applicable as well. It can be understandable that when the first graphite is too much compared to the second graphite, the graphite microcrystals cannot completely cover the surface of the natural graphite particles. Compared with the natural graphite, the graphite microcrystals have excellent power performance and higher gram capacity, wherein if the content of graphite microcrystals is small, it will lead to poor power performance. When the first graphite is too small compared to the second graphite, it will cause that the irreversible capacity is high. Preferably, the mass ratio of the first graphite to the second graphite is (90-100):(1-10).

As an optional technical solution of the present application, the mixing in Step S100 is carried out in a mixer, which comprises a VC mixer, a three-dimensional mixer, a triple eccentric mixer, a horizontal mixer, a plough mixer, a conical mixer or a V-shaped mixer, which is not limited here, as long as the first graphite and the second graphite are uniformly mixed.

As an optional technical solution for the present application, a fusion machine is used for the coating treatment. During the coating process, the rotation speed of the fusion machine is controlled to be 500 r/min-3000 r/min, specifically may be 500 r/min, 1000 r/min, 1500 r/min, 2000 r/min, 2500 r/min or 3000 r/min and the like. The width of the cutter gap of the fusion machine is 0.01 cm to 0.5 cm, and specifically it can be 0.01 cm, 0.05 cm, 0.1 cm, 0.2 cm, 0.3 cm, 0.4 cm or 0.5 cm and the like.

As an optional technical solution of the present application, the coating treatment has a duration of 10 min~120 min, such as 10 min, 30 min, 50 min, 80 min, 100 min or 120 min and the like.

In the present application, the fusion method is used to coat the graphite microcrystals on the first graphite core. It should be noted that by controlling the process parameters, such as the rotation speed, the width of the cutter gap, and the processing time of the fusion machine, it is beneficial to make the graphite microcrystals uniformly deposited on the surface of the natural graphite, so as to use the excellent power performance and higher gram capacity of the graphite microcrystals to solve the defects of the natural graphite. And because of the fusion process being used, the graphite microcrystal can be made to be firmly embedded on the first graphite core, and then by means of being coated with the amorphous carbon subsequently, the stronger structure of the graphite core-graphite microcrystal-amorphous carbon layer is formed. The graphite microcrystal and the amorphous carbon form a composite coating layer, which makes the synergistic reaction between them utilized fully, so that the negative electrode material has high capacity, high first-time efficiency and excellent power performance.

In step S200, the first graphite coated with the second graphite is coated with carbon to obtain the negative electrode material.

Specifically, Step S200 may comprise: mixing the first graphite coated with the second graphite with an amorphous carbon precursor, and then carbonizing it in a protective atmosphere to obtain the negative electrode material.

As an optional technical solution of the present application, the mass ratio of the first graphite coated with the second graphite to the amorphous carbon precursor is (80-100):(0-20), and the mass of the amorphous carbon precursor is not 0. Specifically, it can be 80:1, 90:1, 100:1, 80:10, 100:10, 90:10, 80:20 or 100:20 and the like. It can be understandable that, when the first graphite coated with the second graphite is too much compared to the amorphous carbon precursor, the carbon content in the composite coating layer will be caused to decrease, and the irreversible capacity will increase. When the first graphite coated with the second graphite is too small compared with the amorphous carbon precursor, the carbon layer coated on the second graphite surface is likely to be too thick, and the lithium-ion transmission path becomes longer, which will cause the battery capacity to decrease. Preferably, the mass ratio of the first graphite coated with the second graphite to the amorphous carbon precursor is (80-100):(2-20).

As an optional technical solution of the present application, the amorphous carbon precursor comprises asphalt and/or resin, and the asphalt comprises at least one of coal asphalt, petroleum asphalt, modified asphalt, and mesophase asphalt; and the resin comprises at least one of phenol resin, epoxy resin and furfural resin.

Similarly, the mixing of the first graphite coated with the second graphite and the amorphous carbon precursor is carried out in a mixer, which comprises a VC mixer, a three-dimensional mixer, a triple eccentric mixer, a horizontal mixer, a plough mixer, a conical mixer or a V-shaped mixer, which is not limited here, as long as the first graphite coated with the second graphite and the amorphous carbon precursor are uniformly mixed.

In order to ensure that the first graphite coated with the second graphite and the amorphous carbon precursor are mixed fully and uniformly, the mixing duration is more than 5 min, specifically, may be 5 min, 10 min, 15 min, or 20 min and the like, which is not limited here.

As an optional technical solution of the present application, the gas of the protective atmosphere comprises at least one of nitrogen, helium, neon, argon, and xenon.

As an optional technical solution of the present application, the carbonization treatment can be carried out in a roller kiln, a pusher kiln, a tunnel kiln, a tube furnace, a box furnace or a rotary kiln.

Specifically, the temperature of the carbonization treatment is 800° C. to 1400° C., and specifically may be 800° C., 900° C., 1000° C., 1100° C., 1200° C., 1300° C., or 1400° C., and the like.

The carbonization treatment has a duration of 1 h~72 h, and specifically may be 1 h, 10 h, 20 h, 30 h, 40 h, 50 h, 60 h, 70 h, 72 h, and the like, preferably 1 h-24 h.

The heating rate of the carbonization treatment is below 20.0° C./min, and specifically may be 20.0° C./min, 15.0° C./min, 10.0° C./min, 5.0° C./min, 1.0° C./min, and the like, preferably 1.0° C./min to 5.0° C./min.

It should be noted that by controlling the process parameters, such as the temperature, duration and heating rate of the carbonization treatment, it is beneficial for the amorphous carbon precursor to uniformly form an amorphous carbon outer layer on the surface of the second graphite inner layer, so that the negative electrode material has the high capacity, the low irreversible capacity and excellent power performance, by using the mutual cooperation between the second graphite inner layer and the amorphous carbon outer layer.

Further, after Step S200, the method further comprises:
making the negative electrode material crushed, sieved and demagnetized so that the median particle diameter of the negative electrode material is controlled at 2.0 μm-30.0 μm.

Optionally, the equipment used for the crushing comprises at least one of an internal grading impact micro powder machine, an air current scroll pulverizer, a pendulum mill, a fusion machine, and a sand mill. The equipment used for the sieving comprises an ultrasonic vibrating screen or an air flow screen. The equipment used for demagnetization comprises a demagnetizer.

As an optional technical solution of the present application, the method comprises:
purifying the graphite microcrystals with an acidic aqueous solution so that the fixed carbon content is greater than or equal to 99.9%;
mixing the natural graphite and the graphite microcrystal powders according to the mass ratio of (90-100):(1-10), and carrying out the coating treatment for 10 min~120 min, to obtain the natural graphite coated with graphite microcrystals; and
mixing the natural graphite coated with the graphite microcrystals and the amorphous carbon precursor according to the mass ratio of (80-100):(2-20), and making the temperature increased to 800° C. to 1400° C. at the heating rate of 1.0° C./min~5.0° C./min, and performing the carbonization treatment for 1 h to 24 h, under a protective gas atmosphere, to obtain the negative electrode material.

In a third aspect, the present application provides a lithium ion battery, the lithium ion battery comprising the negative electrode material described in the first aspect or the negative electrode material prepared by the preparation method described in the second aspect.

Embodiments of the present application are further explained by means of a number of examples. Here, the embodiments of the present application are not limited to the following specific embodiments. Within the scope of protection, appropriate modified implementations can be made.

EXAMPLE 1

In this example, a composite coating negative electrode material was prepared according to the following method, comprising:
(1) using a jet mill to crush the graphite microcrystals whose fixed carbon content is 90%, to obtain graphite microcrystal powders with a median particle diameter D50 of 0.8 μm; adding the graphite microcrystal powders to a mixed acid water solution of HF, $HNO_3$ and HCl (the mass concentrations of HF, $HNO_3$ and HCl are 6.2 wt %, 6.8 wt % and 12 wt %, respectively); purifying it to a fixed carbon content of 99.9%; then washing it with water to be of neutrality; and performing drying to obtain the purified graphite microcrystals;
(2) placing into a the VC mixer the spherical natural graphite and the above-mentioned purified graphite microcrystals based on the mass ratio of 98:3, wherein the spherical natural graphite has the median particle diameter D50 of 8.5 μm, the tap density of 0.75 g/cm$^3$, and the fixed carbon content of 99.9%, adjusting the rotational speed to 3000.0 r/min and mixing for 0.5 h, so as to obtain mixed powders of natural graphite and graphite microcrystals; placing the above-mentioned mixed powders of natural graphite and graphite microcrystals into the fusion machine, and adjusting the rotational speed to 2000 r/min, with the cutter gap width of 0.1 cm and the processing duration of 20 min, so as to obtain the spherical natural graphite coated with graphite microcrystals; and
(3) placing into the VC mixer the spherical natural graphite coated with graphite microcrystals and the asphalt powders with a median particle diameter of D50 of 2.5 μm based on a mass ratio of 96:4, adjusting the relational speed to 3000.0 r/min, and mixing the mixture for 0.5 h, and then placing the resultant into a roller kiln, introducing nitrogen, heating to 1150.0° C. at a heating rate of 4.0° C./min, maintaining the temperature for 6.0 h, cooling naturally the resultant to the room temperature, performing the crushing, sieving, and demagnetization to obtain the negative electrode material of a median particle diameter D50 of 9.1 μm.

The negative electrode material prepared in this example comprises a spherical natural graphite core and a composite coating layer coated on the spherical natural graphite core. The composite coating layer comprises a graphite microcrystal coating layer formed on the surface of the natural graphite core and serving as the second graphite inner layer, and the amorphous carbon outer layer formed on the surface of the second graphite inner layer, wherein the graphite microcrystal coating layer is at least partially embedded in the natural graphite core. The median particle diameter of the negative electrode material is 9.1 μm, the thickness of the composite coating layer is 0.6 μm, the powder-body tap density of the negative electrode material is 0.82 g/cm$^3$, and the specific surface area is 4.33 m$^2$/g.

Table 1 shows the performance test results of the composite coating negative electrode material prepared in this example.

Figure 3:
FIG. 3 is an SEM image of the negative electrode material prepared in Example 1 of the present application.

FIG. 3 is a scanning electron micrograph of the composite coating negative electrode material prepared in this example. It can be seen from this figure that the particles of the composite coating negative electrode material prepared in this example are spherical or blocky, with the surface having a composite coating layer with the relatively high degree of disorder.

EXAMPLE 2

In this example, the composite coating negative electrode material was prepared according to the following method, comprising:
(1) using a jet mill to crush the graphite microcrystals whose fixed carbon content is 80%, to obtain graphite microcrystal powders with a median particle diameter D50 of 1.0 μm, adding the graphite microcrystal powders to a mixed acid water solution of HF, $HNO_3$ and HCl (the mass concentrations of HF, $HNO_3$ and HCl are 6.2 wt %, 6.8 wt % and 12 wt %, respectively); purifying it to a fixed carbon content of 99.9%; then washing it with water to be of neutrality; and performing drying to obtain the purified graphite microcrystal powders;
(2) placing into a three dimensional mixer the spherical natural graphite and the above-mentioned purified graphite microcrystal powders based on the mass ratio of 96:4, wherein the spherical natural graphite has the median particle diameter D50 of 8.9 μm, the tap density of 0.72 g/cm$^3$, and the fixed carbon content of 99.9%, mixing the mixture for 1 h, so as to obtain mixed powders of natural graphite and graphite microcrystals; placing the above-mentioned mixed powders of natural graphite and graphite microcrystals into the fusion machine, and adjusting the rotational speed to 2500 r/min, with the cutter gap width of 0.05 cm and the processing duration of 30 min, so as to obtain the spherical natural graphite coated with graphite microcrystals; and
(3) placing into the three dimensional mixer the spherical natural graphite coated with graphite microcrystals and the asphalt powders with a median particle diameter of D50 of 2.8 μm based on a mass ratio of 94:6, mixing the mixture for 1 h, and then placing the resultant into a roller kiln, introducing nitrogen, heating to 1200.0° C. at a heating rate of 2.0° C./min, maintaining the temperature for 4.0 h, cooling naturally the resultant to the room temperature, performing the crushing, sieving, and demagnetization to obtain the composite coating negative electrode material of a median particle diameter D50 of 9.7 μm.

The negative electrode material prepared in this example comprises a spherical natural graphite core and a composite coating layer coated on the spherical natural graphite core. The composite coating layer comprises a graphite microcrystal coating layer formed on the surface of the natural graphite core and serving as the second graphite inner layer, and the amorphous carbon outer layer formed on the surface of the second graphite inner layer, wherein the graphite microcrystal coating layer is at least partially embedded in the natural graphite core. The median particle diameter of the negative electrode material is 9.7 μm, the thickness of the composite coating layer is 0.8 μm, the powder-body tap density of the negative electrode material is 0.83 g/cm$^3$, and the specific surface area is 3.57 m$^2$/g.

Table 1 shows the performance test results of the composite coating negative electrode material prepared in this example.

EXAMPLE 3

In this example, the composite coating negative electrode material was prepared according to the following method, comprising:
(1) using a sand mill to crush the graphite microcrystals whose fixed carbon content is 90%, to obtain graphite microcrystal powders with a median particle diameter D50 of 0.5 μm; adding the graphite microcrystal powders to a mixed acid water solution of HF, $HNO_3$ and HCl (the mass concentrations of HF, $HNO_3$ and HCl are 6.2 wt %, 6.8 wt % and 12 wt %, respectively); purifying it to a fixed carbon content of 99.9%; then washing it with water to be of neutrality; and performing drying to obtain the purified graphite microcrystal powders;
(2) placing into a VC mixer the spherical natural graphite and the above-mentioned purified graphite microcrystal powders based on the mass ratio of 98:2, wherein the spherical natural graphite has the median particle diameter D50 of 8.6 μm, the tap density of 0.75 g/cm$^3$, and the fixed carbon content of 99.9%, adjusting the rotational speed to 3000.0 r/min and mixing for 0.5 h, so as to obtain mixed powders of natural graphite and graphite microcrystals; placing the above-mentioned mixed powders of natural graphite and graphite microcrystals into the fusion machine, and adjusting the rotational speed to 2000 r/min, with the cutter gap width of 0.05 cm and the processing duration of 20 min, so as to obtain the spherical natural graphite coated with graphite microcrystals; and
(3) placing into the conical mixer the spherical natural graphite coated with graphite microcrystals and the phenolic resin powders with a median particle diameter of D50 of 5.8 μm based on a mass ratio of 94:6, mixing the mixture for 1 h, and then placing the resultant into a box furnace, introducing argon, heating to 1050.0° C. at a heating rate of 1.0° C./min, maintaining the temperature for 4.0 h, cooling naturally to the room temperature, performing the crushing, sieving, and demagnetization to obtain the composite coating negative electrode material of a median particle diameter D50 of 9.8 μm.

The negative electrode material prepared in this example comprises a spherical natural graphite core and a composite coating layer coated on the spherical natural graphite core. The composite coating layer comprises a graphite microcrystal coating layer formed on the surface of the natural graphite core and serving as the second graphite inner layer, and the amorphous carbon outer layer formed on the surface of the second graphite inner layer, wherein the graphite microcrystals are at least partially embedded in the natural graphite core. The median particle diameter of the negative electrode material is 9.8 μm, the thickness of the composite coating layer is 1.2 μm, the powder-body tap density of the negative electrode material is 0.85 g/cm$^3$, and the specific surface area is 4.37 m$^2$/g.

Table 1 shows the performance test results of the composite coating negative electrode material prepared in this example.

EXAMPLE 4

In this example, the composite coating negative electrode material was prepared according to the following method, comprising:
(1) using a jet mill to crush the graphite microcrystals whose fixed carbon content is 90%, to obtain graphite microcrystal powders with a median particle diameter D50 of 1.1 µm, adding the graphite microcrystal powders to a mixed acid water solution of HF, $HNO_3$ and HCl (the mass concentrations of HF, $HNO_3$ and HCl are 6.2 wt %, 6.8 wt % and 12 wt %, respectively); purifying it to a fixed carbon content of 99.9%; then washing it with water to be of neutrality; and performing drying to obtain the purified graphite microcrystal powders;
(2) placing into a VC mixer the spherical natural graphite and the above-mentioned purified graphite microcrystal powders based on the mass ratio of 96:4, wherein the spherical natural graphite has the median particle diameter D50 of 6.8 µm, the tap density of 0.68 g/cm³, and the fixed carbon content of 99.9%, adjusting the rotational speed to 3000.0 r/min and mixing for 1 h, so as to obtain mixed powders of natural graphite and graphite microcrystals; placing the above-mentioned mixed powders of natural graphite and graphite microcrystals into the fusion machine, and adjusting the rotational speed to 2500 r/min, with the cutter gap width of 0.05 cm and the processing duration of 20 min, so as to obtain the spherical natural graphite coated with graphite microcrystals; and
(3) placing into the VC mixer the spherical natural graphite coated with graphite microcrystals, the asphalt powders with a median particle diameter of D50 of 2.8 µm, and the phenolic resin powders with a median particle diameter of D50 of 4.7 µm based on a mass ratio of 94:3:3, adjusting the rotational speed to 3000.0 r/min and mixing for 1 h, and then placing the resultant into a box furnace, introducing argon, heating to 1150.0° C. at a heating rate of 1.5° C./min, maintaining the temperature for 4.0 h, cooling naturally the resultant to the room temperature, performing the crushing, sieving, and demagnetization to obtain the composite coating negative electrode material of a median particle diameter D50 of 8.2 µm.

The negative electrode material prepared in this example comprises a spherical natural graphite core and a composite coating layer coated on the spherical natural graphite core. The composite coating layer comprises a graphite microcrystal coating layer formed on the surface of the natural graphite core and serving as the second graphite inner layer, and the amorphous carbon outer layer formed on the surface of the second graphite inner layer, wherein the graphite microcrystal coating layer is at least partially embedded in the natural graphite core. The median particle diameter of the negative electrode material is 8.2 µm, the thickness of the composite coating layer is 1.4 µm, the powder-body tap density of the negative electrode material is 0.71 g/cm³, and the specific surface area is 4.81 m²/g.

Table 1 shows the performance test results of the composite coating negative electrode material prepared in this example.

EXAMPLE 5

In this example, the composite coating negative electrode material was prepared according to the following method, comprising:
(1) using a jet mill to crush the graphite microcrystals whose fixed carbon content is 90%, to obtain graphite microcrystal powders with a median particle diameter D50 of 2.0 µm, adding the graphite microcrystal powders to a mixed acid water solution of HF, $HNO_3$ and HCl (the mass concentrations of HF, $HNO_3$ and HCl are 6.2 wt %, 6.8 wt % and 12 wt %, respectively); purifying it to a fixed carbon content of 99.9%; then washing it with water to be of neutrality; and performing drying to obtain the purified graphite microcrystal powders;
(2) placing into a VC mixer the spherical natural graphite and the above-mentioned purified graphite microcrystal powders based on the mass ratio of 90:10, wherein the spherical natural graphite has the median particle diameter D50 of 14.1 µm, the tap density of 0.85 g/cm³, and the fixed carbon content of 99.9%, adjusting the rotational speed to 3000.0 r/min and mixing for 1 h, so as to obtain mixed powders of natural graphite and graphite microcrystals; placing the above-mentioned mixed powders of natural graphite and graphite microcrystals into the fusion machine, and adjusting the rotational speed to 3000 r/min, with the cutter gap width of 0.5 cm and the processing duration of 10 min, so as to obtain the spherical natural graphite coated with graphite microcrystals; and
(3) placing into the VC mixer the spherical natural graphite coated with graphite microcrystals, the asphalt powders with a median particle diameter of D50 of 2.8 µm, and the phenolic resin powders with a median particle diameter of D50 of 4.7 µm based on a mass ratio of 80:10:10, adjusting the rotational speed to 3000.0 r/min and mixing for 1 h, and then placing the resultant into a box furnace, introducing argon, heating to 1400.0° C. at a heating rate of 5° C./min, maintaining the temperature for 1.0 h, cooling naturally the resultant to the room temperature, performing the crushing, sieving, and demagnetization to obtain the composite coating negative electrode material of a median particle diameter D50 of 16.5 µm.

The negative electrode material prepared in this example comprises a spherical natural graphite core and a composite coating layer coated on the spherical natural graphite core. The composite coating layer comprises a graphite microcrystal coating layer formed on the surface of the natural graphite core and serving as the second graphite inner layer, and the amorphous carbon outer layer formed on the surface of the second graphite inner layer, wherein the graphite microcrystal coating layer is at least partially embedded in the natural graphite core. The median particle diameter of the negative electrode material is 16.5 µm, the thickness of the composite coating layer is 2.4 µm, the powder-body tap density of the negative electrode material is 0.97 g/cm³, and the specific surface area is 2.07 m²/g.

Table 1 shows the performance test results of the composite coating negative electrode material prepared in this example.

EXAMPLE 6

In this example, the composite coating negative electrode material was prepared according to the following method, comprising:
(1) using a sand mill to crush the graphite microcrystals whose fixed carbon content is 90%, to obtain graphite microcrystal powders with a median particle diameter D50 of 0.6 µm; adding the graphite microcrystal powders to a mixed acid water solution of HF, HNO$_3$ and HCl (the mass concentrations of HF, HNO$_3$ and HCl are 6.2 wt %, 6.8 wt % and 12 wt %, respectively); purifying it to a fixed carbon content of 99.9%; then washing it with water to be of neutrality; and performing drying to obtain the purified graphite microcrystal powders;

(2) placing into a VC mixer the spherical natural graphite and the above-mentioned purified graphite microcrystal powders based on the mass ratio of 99:1, wherein the spherical natural graphite has the median particle diameter D50 of 3.6 μm, the tap density of 0.45 g/cm$^3$, and the fixed carbon content of 99.9%, adjusting the rotational speed to 3000.0 r/min and mixing for 0.5 h, so as to obtain mixed powders of natural graphite and graphite microcrystals; placing the above-mentioned mixed powders of natural graphite and graphite microcrystals into the fusion machine, and adjusting the rotational speed to 500 r/min, with the cutter gap width of 0.01 cm and the processing duration of 120 min, so as to obtain the spherical natural graphite coated with graphite microcrystals; and (3) placing into the conical mixer the spherical natural graphite coated with graphite microcrystals and the phenolic resin powders with a median particle diameter of D50 of 4.1 μm based on a mass ratio of 98:2, mixing for 1 h, and then placing the resultant into a box furnace, introducing argon, heating to 800.0° C. at a heating rate of 1.0° C./min, maintaining the temperature for 24.0 h, cooling naturally the resultant to the room temperature, performing the crushing, sieving, and demagnetization to obtain the composite coating negative electrode material of a median particle diameter D50 of 4.3 μm.

The negative electrode material prepared in this example comprises a spherical natural graphite core and a composite coating layer coated on the spherical natural graphite core. The composite coating layer comprises a graphite microcrystal coating layer formed on the surface of the natural graphite core and serving as the second graphite inner layer, and the amorphous carbon outer layer formed on the surface of the second graphite inner layer, wherein the graphite microcrystal coating layer is at least partially embedded in the natural graphite core. The median particle diameter of the negative electrode material is 4.3 μm, the thickness of the composite coating layer is 0.7 μm, the powder-body tap density of the negative electrode material is 0.50 g/cm$^3$, and the specific surface area is 12.10 m$^2$/g.

Table 1 shows the performance test results of the composite coating negative electrode material prepared in this example.

COMPARATIVE EXAMPLE 1

In this comparative example, the spherical natural graphite in Example 1 wherein the median particle diameter D50 is 8.5 μm, the tap density is 0.75 g/cm$^3$, the specific surface area is 6.94 m$^2$/g, and the fixed carbon content is 99.9%, without being subjected to the coating and modification treatments, was directly subjected to the sieving and the demagnetization, so as to obtain the natural graphite negative electrode material with median particle diameter D50 of 8.5 μm, for comparison.

Table 1 shows the performance test results of the natural graphite negative electrode material prepared in this comparative example.

COMPARATIVE EXAMPLE 2

In this comparative example, the spherical natural graphite with the median particle diameter D50 of 8.5 μm, the tap density of 0.75 g/cm$^3$ and a fixed carbon content of 99.9% in Example 1 and the asphalt powders with the median particle diameter D50 of 2.5 μm were placed into a VC mixer at a mass ratio of 96:4, the rotational speed was adjusted to 3000.0 r/min, they were mixed for 0.5 h, then placed into a roller kiln with nitrogen filled therein, the temperature was raised to 1150.0° C. at a heating rate of 4.0° C./min and kept for 6.0 h, the resultant was naturally cooled to the room temperature, and crushed, sieved, and demagnetized to obtain the coating negative electrode material with the median particle diameter D50 of 8.9 μm.

The negative electrode material obtained in this comparative example comprises a spherical natural graphite core and a coating layer coated on the core. The coating layer is composed of the amorphous carbon only. The thickness of the coating layer is 0.4 μm. The powder-body tap density of the negative electrode material is 0.83 g/cm$^3$ and the specific surface area is 4.01 m$^2$/g.

Table 1 shows the performance test results of the coating negative electrode material prepared in this comparative example.

COMPARATIVE EXAMPLE 3

In this comparative example, the graphite microcrystal coating natural graphite negative electrode material was prepared according to the following method, comprising:

(1) using a jet mill to crush the graphite microcrystals whose fixed carbon content is 90%, to obtain graphite microcrystal powders with a median particle diameter D50 of 0.8 μm; adding the graphite microcrystal powders to a mixed acid water solution of HF, HNO$_3$ and HCl (the mass concentrations of HF, HNO$_3$ and HCl are 6.2 wt %, 6.8 wt % and 12 wt %, respectively); purifying it to a fixed carbon content of 99.9%; then washing it with water to be of neutrality; and performing drying to obtain the purified graphite microcrystal powders;

(2) placing into a VC mixer the spherical natural graphite and the above-mentioned purified graphite microcrystal powders based on the mass ratio of 98:3, wherein the spherical natural graphite has the median particle diameter D50 of 8.5 μm, the tap density of 0.75 g/cm$^3$, and the fixed carbon content of 99.9%, adjusting the rotational speed to 3000.0 r/min and mixing for 0.5 h, so as to obtain mixed powders of natural graphite and graphite microcrystals; placing the above-mentioned mixed powders of natural graphite and graphite microcrystals into the fusion machine, and adjusting the rotational speed to 2000 r/min, with the cutter gap width of 0.1 cm and the processing duration of 20 min, so as to obtain the spherical natural graphite coated with graphite microcrystals, and making it subjected to sieving and demagnetization to obtain the coating negative electrode material with the medium particle diameter D50 of 8.6 μm.

The negative electrode material prepared in this comparative example comprises a spherical natural graphite core and a coating layer coated on the core. The coating layer is composed of graphite microcrystals only. The thickness of the coating layer is 0.1 μm, the powder-body tap density of the negative electrode material is 0.71 g/cm$^3$, and the compacted density is 8.55 g/cm$^3$.

Table 1 shows the performance test results of the coating negative electrode material prepared in this comparative example.

COMPARATIVE EXAMPLE 4

In this comparative example, a composite coating negative electrode material was prepared according to the following method, comprising:
(1) placing into the VC mixer the spherical natural graphite with the median particle diameter D50 of 8.5 μm, the tap density of 0.75 g/cm³, and a fixed carbon content of 99.9%, and graphite microcrystals with the median particle diameter D50 of 0.8 μm, based on the mass ratio of 98:3, adjusting the rotational speed to 3000.0 r/min, mixing for 0.5 h to obtain the mixed powders of natural graphite and graphite microcrystals; placing the above-mentioned mixed powders of natural graphite and graphite microcrystals into the fusion machine, adjusting the rotational speed to 2000 r/min, with the cutter gap width of 0.1 cm, and the processing duration of 20 min, to obtain the spherical natural graphite coated with graphite microcrystals;
(2) adding the spherical natural graphite coated with graphite microcrystals into to a mixed acid aqueous solution of HF, HNO₃ and HCl (the mass concentrations of HF, HNO₃ and HCl are 6.2 wt %, 6.8 wt % and 12 wt %, respectively) for being purified, and then making it washed with water to be of neutrality, and dried to obtain purified spherical natural graphite coated with graphite microcrystals; and
(3) placing into a VC mixer the purified spherical natural graphite coated with the graphite microcrystals and the asphalt powders with the median particle diameter of D50 of 2.5 μm at a mass ratio of 96:4, adjusting the rotational speed to 3000.0 r/min, and mixing for 0.5 h, then placing it into a roller kiln, with nitrogen filled therein, heating up to 1150.0° C. at a heating rate of 4.0° C./min, maintaining the temperature for 6.0 h, cooling the resultant to the room temperature naturally, making it subjected to crushing, sieving, and demagnetization to obtain the negative electrode material with the median particle diameter D50 of 9.3 μm.

COMPARATIVE EXAMPLE 5

In this comparative example, a composite coating negative electrode material was prepared according to the following method, comprising:
(1) placing, at a mass ratio of 98:3, into a VC mixer, the spherical natural graphite with the median particle diameter D50 of 8.5 μm, the tap density of 0.75 g/cm³, and the fixed carbon content of 99.9%, and the graphite microcrystals with a median particle diameter D50 of 0.8 μm that has not been purified by acid pickling, adjusting the rotational speed to 3000.0 r/min, and mixing for 0.5 h to obtain the mixed powders of natural graphite and graphite microcrystals; and placing the above-mentioned mixed powders of natural graphite and graphite microcrystals into the fusion machine, and adjusting the rotational speed to 2000 r/min with the cutter gap width of 0.1 cm, and the processing duration of 20 min, to obtain the spherical natural graphite coated with the graphite microcrystals;
(2) placing into a VC mixer the spherical natural graphite coated with graphite microcrystals and the asphalt powder with the median particle diameter D50 of 2.5 μm at a mass ratio of 96:4, adjusting the rotational speed to 3000.0 r/min, and mixing for 0.5 h, then placing it into a roller kiln, with nitrogen filled therein, heating to 1150.0° C. at a heating rate of 4.0° C./min, keeping the temperature for 6.0 h, cooling it to the room temperature naturally, making it subjected to crushing, sieving, and demagnetization to obtain the negative electrode material of the median particle diameter D50 of 9.0 μm.

COMPARATIVE EXAMPLE 6

In this comparative example, a composite coating negative electrode material was prepared according to the following method, comprising:
(1) using a sand mill to crush the graphite microcrystals whose fixed carbon content is 90%, to obtain graphite microcrystal powders with a median particle diameter D50 of 1.0 μm, adding the graphite microcrystal powders to a mixed acid water solution of HF, HNO₃ and HCl (the mass concentrations of HF, HNO₃ and HCl are 6.2 wt %, 6.8 wt % and 12 wt %, respectively); purifying it to a fixed carbon content of 99.9%; then washing it with water to be of neutrality; and performing drying to obtain the purified graphite microcrystal powders;
(2) placing into a VC mixer the spherical natural graphite with the median particle diameter D50 of 8.5 μm, the tap density of 0.75 g/cm³, and the fixed carbon content of 99.9% and asphalt powders with the median particle diameter D50 of 2.5 μm at a mass ratio of 96:4, adjusting the rotational speed to 3000.0 r/min, mixing for 0.5 h, then placing it into a roller kiln with nitrogen filled therein, heating up to 1150.0° C. at a heating rate of 4.0° C./min, keeping the temperature for 6.0 h, and cooling naturally the resultant to the room temperature, making it subjected to crushing, sieving, and demagnetization to obtain the amorphous carbon coating natural graphite with the median particle diameter D50 of 8.9 μm;
(3) placing into the VC mixer the amorphous carbon coating natural graphite with the median particle diameter D50 of 8.9 μm and the graphite microcrystals with the median particle diameter D50 of 0.8 μm at a mass ratio of 98:3, and adjusting the rotational speed to 3000.0 r/min, mixing for 0.5 h to obtain mixed powder of natural graphite and graphite microcrystals; placing the above-mentioned mixed powders of natural graphite and graphite microcrystals into a fusion machine, adjusting the rotational speed to 2000 r/min, with the cutter gap width of 0.1 cm, and the processing duration of 20 min to obtain the amorphous carbon coating natural graphite coated with graphite microcrystals, which is further demagnetized and sieved to obtain a negative electrode material with the median particle diameter D50 of 9.0 μm.

Test Method

The following method was used to test the negative electrode materials of each example and each comparative example.

The tap density was tested using Quantachrome AutoTap tap density meter.

The Tristar3000 fully automatic specific surface area and porosity analyzer, from Micromeritics of the United States, was used to test the specific surface area of the material.

Malvern laser particle diameter tester MS 2000 was used to test the particle diameter range of the material and the average particle diameter of the raw material particles.

A Hitachi S4800 scanning electron microscope was used to observe the surface morphology and particle size of the sample.

The power performance was tested by using the following method, comprising: making the negative electrode material, conductive agent, dispersant and bonding agent, according to the mass percentage of 94.5:1.5:2:2, dissolved in a solvent and mixed, with the solid content controlled at 40%; making the resultant coated on the copper foil current collector and dried in a vacuum to prepare a negative electrode piece; then assembling a 18650 cylindrical single cell, by means of a conventional production technology, using the ternary positive electrode piece prepared by the traditional mature technology, 1 mol/L LiPF6/EC+DMC+EMC (v/v=1:1:1) electrolyte, Celgard2400 separator, and shell. The charge and discharge test and power test of the cylindrical cell were carried out on the LBT-ML battery module test system of Arbin Company of the United States. The cylindrical cell, after the formation and the division, is tested at the normal temperature for the power density according to "test method for output density and input density of sealed nickel-hydrogen batteries for hybrid electric vehicles" of Japan Electric Vehicle Association Standard JEVS D713 2003.

The test results are shown in the following table.

amorphous carbon only, and the first-time Coulombic efficiency is improved for a certain extent, but the reversible capacity and power density are lower than those of Example 1.

The negative electrode material prepared by the method described in Comparative Example 3 is coated with microcrystals only, and the power density is increased for a certain extent, but its first-time Coulombic efficiency is lower than that of Example 1.

The negative electrode material prepared by the method described in Comparative Example 4 has the reversible capacity and the first-time Coulombic efficiency, both of which are decreased for a certain extent. This is because in the case that the acid pickling purification is carried out after the procedure of the coating, the graphite microcrystals, during the acid pickling purification process, will fall off from the spherical natural graphite, and the graphite microcrystals cannot be evenly embedded on the surface of the spherical natural graphite, and it is difficult to form the composite coating layer after the amorphous carbon coating, such that the reversible capacity and the first-time Coulombic efficiency of the material are both reduced for a certain extent.

The negative electrode material prepared by the method described in Comparative Example 5 has the reversible capacity and the first-time Coulombic efficiency, both of which are decreased for a certain extent. This is because the graphite microcrystals are not purified. The graphite micro-

TABLE 1

|  | Tap density ($g/cm^3$) | Specific surface area ($m^2/g$) | First reversible capacity (mAh/g) | First coulomb efficiency (%) | Discharging power density (W/kg) | Charging power density (W/kg) |
|---|---|---|---|---|---|---|
| Example 1 | 0.82 | 4.33 | 364.2 | 92.1 | 2415 | 2382 |
| Example 2 | 0.83 | 3.57 | 361.5 | 92.8 | 2145 | 2108 |
| Example 3 | 0.85 | 4.37 | 362.0 | 91.9 | 2273 | 2265 |
| Example 4 | 0.71 | 4.81 | 361.9 | 91.0 | 2531 | 2502 |
| Example 5 | 0.97 | 2.07 | 351.6 | 93.2 | 2053 | 2034 |
| Example 6 | 0.50 | 12.10 | 363.3 | 88.1 | 2106 | 2088 |
| Comparative Example 1 | 0.75 | 6.94 | 365.7 | 90.7 | 1804 | 1779 |
| Comparative Example 2 | 0.83 | 4.01 | 360.5 | 92.0 | 1758 | 1722 |
| Comparative Example 3 | 0.71 | 8.55 | 364.9 | 88.7 | 1855 | 1829 |
| Comparative Example 4 | 0.73 | 6.03 | 360.5 | 89.8 | 1760 | 1735 |
| Comparative Example 5 | 0.86 | 4.67 | 359.5 | 86.9 | 1688 | 1647 |
| Comparative Example 6 | 0.75 | 9.43 | 358.6 | 86.2 | 1660 | 1628 |

Based on the foregoing examples and comparative examples, it can be seen that the power density of the lithium ion battery of the negative electrode material prepared by the methods described in Examples 1 to 6 is always better than that of the lithium ion battery of the negative electrode material prepared by the method of the comparative examples. The negative electrode material obtained by the method in the examples has the advantages of high reversible capacity and high first-time Coulombic efficiency.

The negative electrode material prepared by the method described in Comparative Example 1 is not coated and modified. Although its reversible capacity is relatively high, the first-time Coulombic efficiency and power are lower than those of Example 1.

The negative electrode material prepared by the method described in Comparative Example 2 is coated with the crystals contain trace elements and impurities, such as $SiO_2$. The existence of the impurities will cause the irreversible capacity of graphite microcrystals to increase, resulting in the lower first-time efficiency and reduced rate performance.

The inner layer of the composite coating layer of the negative electrode material prepared by the method described in Comparative Example 6 is an amorphous carbon layer. The outer layer of the composite coating layer is a graphite microcrystal layer, that is, the structure of the negative electrode material is the structure of a natural graphite core-amorphous carbon layer—the graphite microcrystals. The reversible capacity and the first-time Coulombic efficiency of the negative electrode material are both reduced for a certain extent, compared to the examples. This is because there is no firm and tight connection between the graphite microcrystal and the natural graphite. There may be tiny gaps between the natural graphite and the graphite microcrystal, which leads to a large internal resistance of the material. There is only a physical embedment between the amorphous carbon and the graphite microcrystal, and the graphite microcrystals are the outermost layer, which causes the graphite microcrystals to easily fall off, thereby failing to form a strong structure, thereby deteriorating its reversible capacity, the first-time Coulombic efficiency and the rate performance.

The applicant declares that the present application illustrates the detailed process equipment and process flow of the present application through the above-mentioned examples, but the present application is not limited to the above detailed process equipment and process flow, which does not mean that the present application is required to rely on the detailed process equipment and process flow described above for implementation. The skilled in the art should be aware that any improvements to the present application, the equivalent replacement of each raw material of the product of the present application, and the addition of auxiliary ingredients, the selection of the specific method, etc., all fall within the scope of protection and disclosure of the present application.

What is claimed is:

1. A negative electrode material, wherein the negative electrode material comprises a first graphite core and a composite coating layer coated on the first graphite core, and the composite coating layer comprises a second graphite inner layer located on a surface of the first graphite core and an amorphous carbon outer layer located on a surface of the second graphite inner layer, and the second graphite inner layer comprises a plurality of graphite microcrystals, wherein a ratio of the median particle diameter of the first graphite core to a median particle diameter of the graphite microcrystal is 5:1-50:1.

2. The negative electrode material according to claim 1, wherein the first graphite core satisfies at least one of following conditions a to e:
   a. the first graphite core comprises natural graphite;
   b. the first graphite core is spherical natural graphite;
   c. the first graphite core has a median particle diameter of 2.0 μm-30.0 μm;
   d. the natural graphite has a powder-body tap density of 0.4 g/cm$^3$-1.0 g/cm$^3$; and
   e. a mass percentage content of fixed carbon in the natural graphite is ≥99.9%.

3. The negative electrode material according to claim 1, wherein the graphite microcrystal satisfies at least one of following conditions a to d:
   a. the graphite microcrystal is at least partially embedded in the first graphite core;
   b. the median particle diameter of the graphite microcrystal is 0 μm-2 μm, not including 0 μm;
   c. a fixed carbon content of the graphite microcrystal is ≥99.9%; and
   d. a powder-body tap density of the graphite microcrystal is 0 g/cm$^3$-0.5 g/cm$^3$, not including 0 g/cm$^3$.

4. The negative electrode material according to claim 1, wherein the negative electrode material satisfies at least one of following conditions a-e:
   a. a median particle diameter of the negative electrode material is 2 μm-32 μm, not including 2 μm;
   b. the negative electrode material has a specific surface area of 0.5 m$^2$/g-20.0 m$^2$/g;
   c. a powder-body tap density of the negative electrode material is 0.5 g/cm$^3$-1.3 g/cm$^3$;
   d. the composite coating layer has a thickness of 0 μm-5 μm, not including 0 μm; and
   e. the amorphous carbon outer layer has a thickness of 0 nm-500 nm, not including 0 nm.

5. A preparation method for the negative electrode material according to claim 1, comprising following steps:
   mixing a first graphite and a second graphite and performing a coating treatment to obtain the first graphite coated by the second graphite, wherein the second graphite is of graphite microcrystal; and
   making the first graphite coated by the second graphite, coated with carbon, to obtain the negative electrode material.

6. The preparation method according to claim 5, wherein the preparation method satisfies at least one of following conditions a-j:
   a. the graphite microcrystal is at least partially embedded in the first graphite;
   b. the first graphite is spheroidal natural graphite;
   c. the first graphite has a median particle diameter of 2.0 μm-30.0 μm;
   d. the first graphite is spheroidal natural graphite, and a mass percentage content of fixed carbon in the natural graphite is ≥99.9%;
   e. a ratio of the median particle diameter of the first graphite to a median particle diameter of the graphite microcrystal is 5:1-50:1;
   f. the median particle diameter of the graphite microcrystal is 0 μm-2 μm, not including 0 μm;
   g. the negative electrode material has a median particle diameter of 2 μm-32 μm, not including 2 μm;
   h. the negative electrode material has a specific surface area of 0.5 m$^2$/g-20.0 m$^2$/g;
   i. the negative electrode material has a powder-body tap density of 0.5 g/cm$^3$-1.3 g/cm$^3$; and
   j. the composite coating layer has a thickness of 0 μm-5 μm, not including 0 μm.

7. The preparation method according to claim 5, wherein, before mixing and coating the first graphite and the second graphite, the method further comprises:
   purifying the graphite microcrystal with an acidic aqueous solution, so that the fixed carbon content of the graphite microcrystal is ≥99.9%.

8. The preparation method according to claim 7, wherein steps of purifying the graphite microcrystal comprises:
   crushing the graphite microcrystal, so that a median particle diameter of particles of the graphite microcrystal is controlled within 0 μm-2 μm, not including 0 μm; and
   purifying the graphite microcrystal with the acidic aqueous solution, so that the fixed carbon content of the graphite microcrystal is ≥99.9%.

9. The preparation method according to claim 7, wherein the preparation method satisfies at least one of following conditions a-b:
   a. acid in the acidic aqueous solution is inorganic acid; and
   b. acid in the acidic aqueous solution is inorganic acid, and the inorganic acid comprises at least one of HCl, HF, H$_2$SO$_4$ and HNO$_3$.

10. The preparation method according to claim 5, wherein the preparation method satisfies at least one of following conditions a-e:
    a. a mass ratio of the first graphite to the second graphite is (80-100):(0-20), and a mass of the second graphite is not 0;

b. the mass ratio of the first graphite to the second graphite is (90-100):(1-10);

c. using a fusion machine for performing a coating treatment, wherein a rotation speed of the fusion machine is 500 r/min-3000 r/min;

d. using a fusion machine for performing a coating treatment, wherein a cutter gap of the fusion machine has a width of 0.01 cm-0.5 cm; and e. a duration of the coating treatment is 10 min-120 min.

11. The preparation method according to claim 5, wherein a step of making the first graphite coated by the second graphite, coated with carbon, to obtain the negative electrode material comprises:

making, the first graphite coated by the second graphite, mixed with an amorphous carbon precursor, and performing a carbonization treatment in a protective atmosphere, to obtain the negative electrode material.

12. The preparation method according to claim 11, wherein the preparation method satisfies at least one of following conditions a-j:

a. a mass ratio of the first graphite coated by the second graphite and the amorphous carbon precursor is (80-100):(0-20), and a mass of the amorphous carbon precursor is not 0;

b. the mass ratio of the first graphite coated by the second graphite and the amorphous carbon precursor is (80-100):(2-20);

c. the amorphous carbon precursor comprises asphalt and/or resin;

d. the amorphous carbon precursor comprises asphalt, and the asphalt comprises at least one of coal asphalt, petroleum asphalt, modified asphalt, and mesophase asphalt;

e. the amorphous carbon precursor comprises resin, and the resin comprises at least one of phenolic resin, epoxy resin and furfural resin;

f. the mixing has a duration more than 5 min;

g. gas of the protective atmosphere comprises at least one of nitrogen, helium, neon, argon and xenon;

h. a temperature of the carbonization treatment is 800° C.-1400° C.;

i. a duration of the carbonization treatment is 1 h-72 h; and j. a heating rate of the carbonization treatment is below 20.0° C./min.

13. The preparation method according to claim 5, wherein after the first graphite coated by the second graphite is coated with carbon to obtain the negative electrode material, the method further comprises:

making the negative electrode material crushed, sieved and demagnetized, so that a median particle diameter of the negative electrode material is controlled at 2.0 μm-30.0 μm.

14. The preparation method according to claim 5, wherein the method comprises following steps:

purifying the graphite microcrystal with the acidic aqueous solution, so that the fixed carbon content is greater than or equal to 99.9%;

mixing natural graphite and graphite microcrystal powder based on a mass ratio of (90-100):(1-10), and carrying out the coating treatment for 10 min-120 min, so as to obtain the natural graphite coated by the graphite microcrystal; and mixing the natural graphite coated by the graphite microcrystal and an amorphous carbon precursor based on a mass ratio of (80-100):(2-20); and increasing a temperature to 800° C. to 1400° C. at a heating rate of 1.0° C./min-5.0° C./min and performing a carbonization treatment for 1 h to 24 h, under a protective gas atmosphere, to obtain the negative electrode material.

15. A lithium ion battery, wherein the lithium ion battery comprises the negative electrode material according to claim 1.

16. The negative electrode material according to claim 2, wherein the graphite microcrystal satisfies at least one of following conditions a to d:

a. the graphite microcrystal is at least partially embedded in the first graphite core;

b. the median particle diameter of the graphite microcrystal is 0 μm-2 μm, not including 0 μm;

c. a fixed carbon content of the graphite microcrystal is ≥99.9%; and d. a powder-body tap density of the graphite microcrystal is 0 g/cm$^3$-0.5 g/cm$^3$, not including 0 g/cm$^3$.

17. The negative electrode material according to claim 2, wherein the negative electrode material satisfies at least one of following conditions a-e:

a. a median particle diameter of the negative electrode material is 2 μm-32 μm, not including 2 μm;

b. the negative electrode material has a specific surface area of 0.5 m$^2$/g-20.0 m$^2$/g;

c. a powder-body tap density of the negative electrode material is 0.5 g/cm$^3$-1.3 g/cm$^3$;

d. the composite coating layer has a thickness of 0 μm-5 μm, not including 0 μm; and e. the amorphous carbon outer layer has a thickness of 0 nm-500 nm, not including 0 nm.

18. The preparation method according to claim 8, wherein the preparation method satisfies at least one of following conditions a-b:

a. acid in the acidic aqueous solution is inorganic acid; and b. acid in the acidic aqueous solution is inorganic acid, and the inorganic acid comprises at least one of HCl, HF, $H_2SO_4$ and $HNO_3$.

19. The preparation method according to claim 6, wherein the preparation method satisfies at least one of following conditions a-e:

a. a mass ratio of the first graphite to the second graphite is (80-100):(0-20), and a mass of the second graphite is not 0;

b. the mass ratio of the first graphite to the second graphite is (90-100):(1-10);

c. using a fusion machine for performing a coating treatment, wherein a rotation speed of the fusion machine is 500 r/min-3000 r/min;

d. using a fusion machine for performing a coating treatment, wherein a cutter gap of the fusion machine has a width of 0.01 cm-0.5 cm; and e. a duration of the coating treatment is 10 min-120 min.

20. The preparation method according to claim 6, wherein a step of making the first graphite coated by the second graphite, coated with carbon, to obtain the negative electrode material comprises:

making, the first graphite coated by the second graphite, mixed with an amorphous carbon precursor, and performing a carbonization treatment in a protective atmosphere, to obtain the negative electrode material.

\* \* \* \* \*